United States Patent [19]

Putsch et al.

[11] Patent Number: 5,218,768

[45] Date of Patent: Jun. 15, 1993

[54] RATCHET CUTTER

[75] Inventors: Ralf Putsch; Karl Putsch, both of Wuppertal, Fed. Rep. of Germany

[73] Assignee: Knipex-Werk C. Gustav Putsch, Wuppertal, Fed. Rep. of Germany

[21] Appl. No.: 718,554

[22] Filed: Jun. 20, 1991

[30] Foreign Application Priority Data

Jul. 24, 1990 [DE] Fed. Rep. of Germany ... 9010931[U]

[51] Int. Cl.$^5$ .............................................. B26B 17/02
[52] U.S. Cl. ............................................ 30/250; 30/253
[58] Field of Search ................. 30/244, 245, 248, 250, 30/234, 253, 120.4, 120.5, 254, 249, 188

[56] References Cited

U.S. PATENT DOCUMENTS

| | | | |
|---|---|---|---|
| 1,454,917 | 5/1923 | Barrett | 30/249 |
| 3,210,844 | 10/1965 | Tontscheff | 30/250 |
| 3,243,880 | 4/1966 | Weller | 30/250 |
| 3,885,309 | 5/1975 | Lund et al. | 30/250 |
| 4,178,682 | 12/1979 | Sadauskas | 30/250 |
| 4,221,048 | 9/1980 | Parramore | 30/250 |
| 4,223,439 | 9/1980 | Rommel | 30/253 |
| 4,378,636 | 4/1983 | Wick | 30/250 |
| 4,644,650 | 2/1987 | Laux et al. | 30/250 |
| 4,779,342 | 10/1988 | Kobayashi et al. | 30/250 |

FOREIGN PATENT DOCUMENTS 1056176 1/1967 United Kingdom .

Primary Examiner—Frank T. Yost
Assistant Examiner—Hwei-Siu Payer
Attorney, Agent, or Firm—Martin A. Farber

[57] ABSTRACT

The present invention relates to a manually-operated ratchet cutter having a moveable and a fixed handle part, the fixed handle part forming a first fixed cutting edge which is developed substantially in the shape of a circular segment and a moveable cutting edge being articulated on an upper end region of the fixed cutting edge for scissor-like cooperation with the fixed cutting edge, the moveable cutting edge moving in a plane parallel to the first cutting edge and cooperating with the latter, and having a ratchet mechanism which comprises a blocking lever and an advance lever and engages in a toothing developed on the outer periphery of the moveable cutting edge. Furthermore, the blocking lever can be moved into a release position. In order to arrive at a development which is simpler in manufacture and more favorable in handling, the invention proposes that the blocking lever (14, 14') engage behind the advance lever (13, 13') in its release position in such a manner that the advance lever (13, 13') is moved out of engagement and at the same time blocks the blocking lever (14, 14') in its release position.

20 Claims, 11 Drawing Sheets

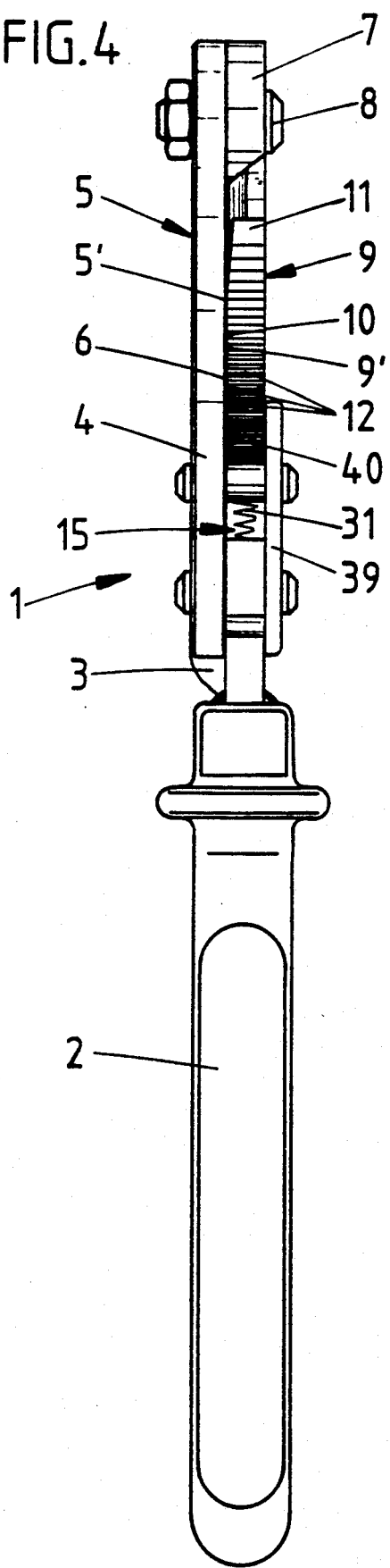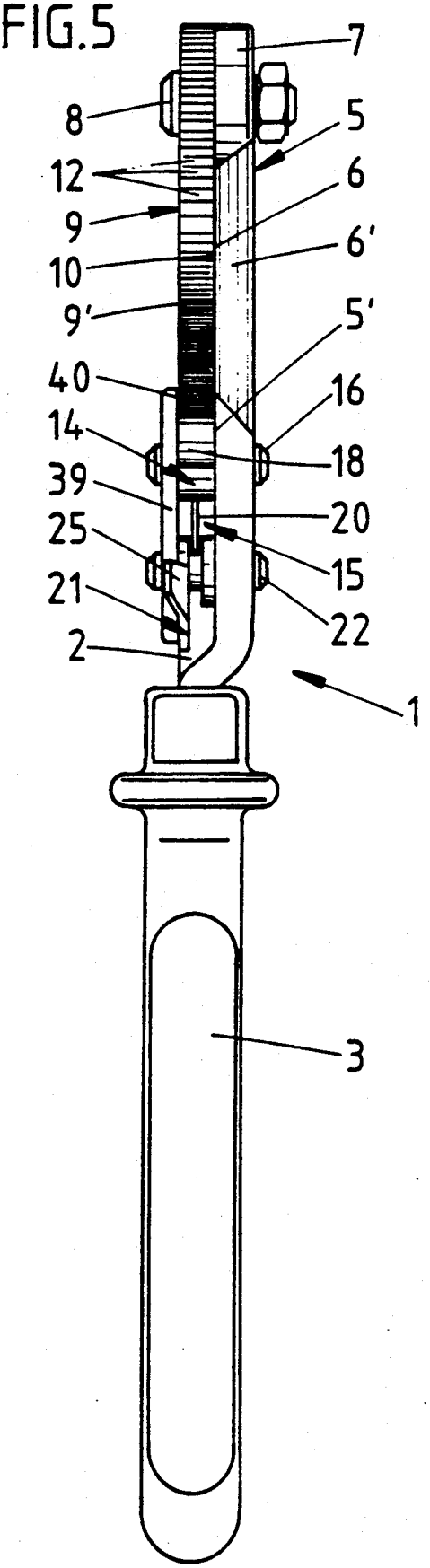

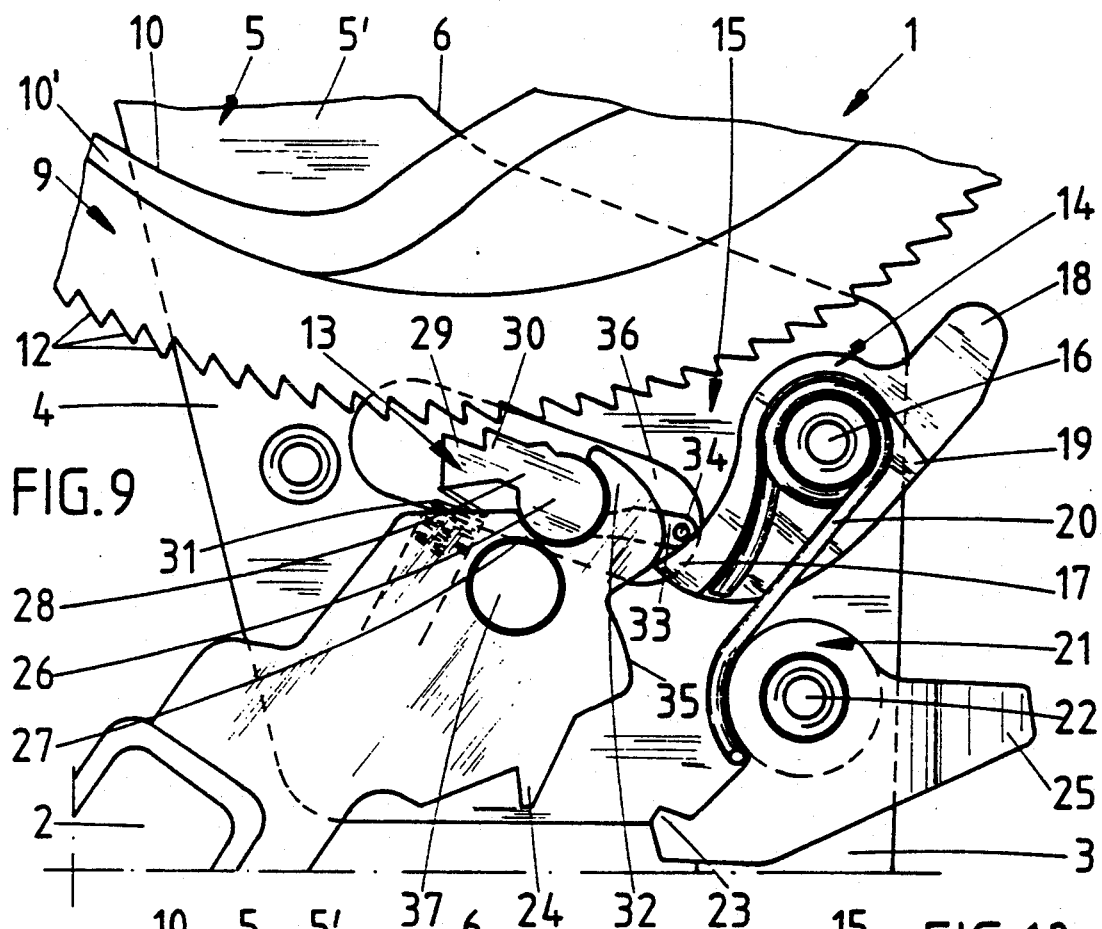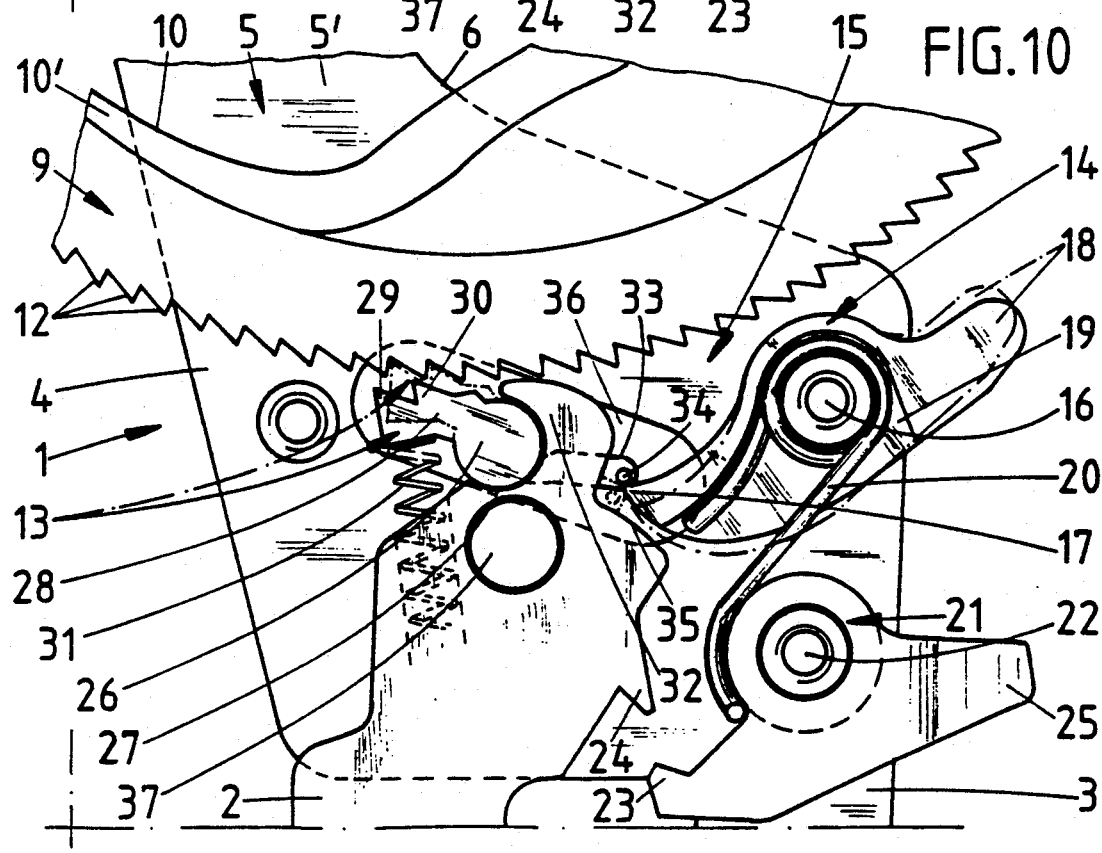

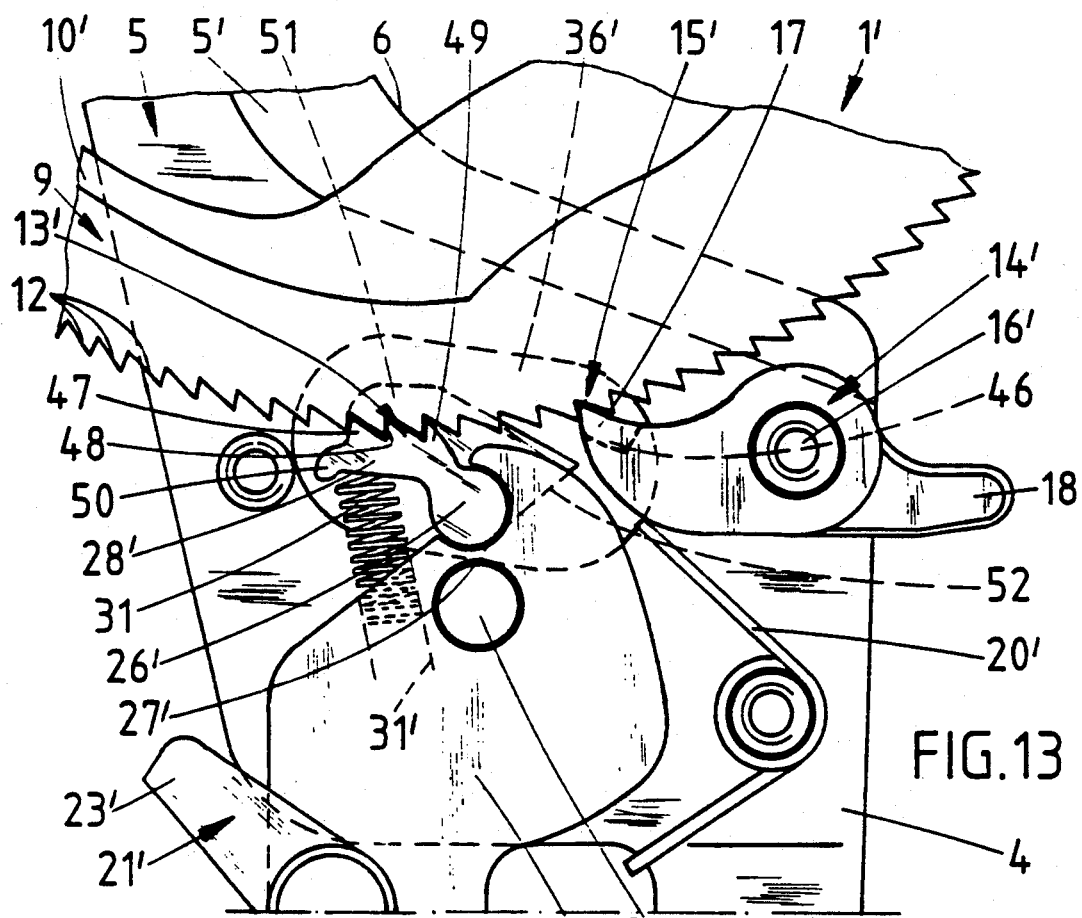
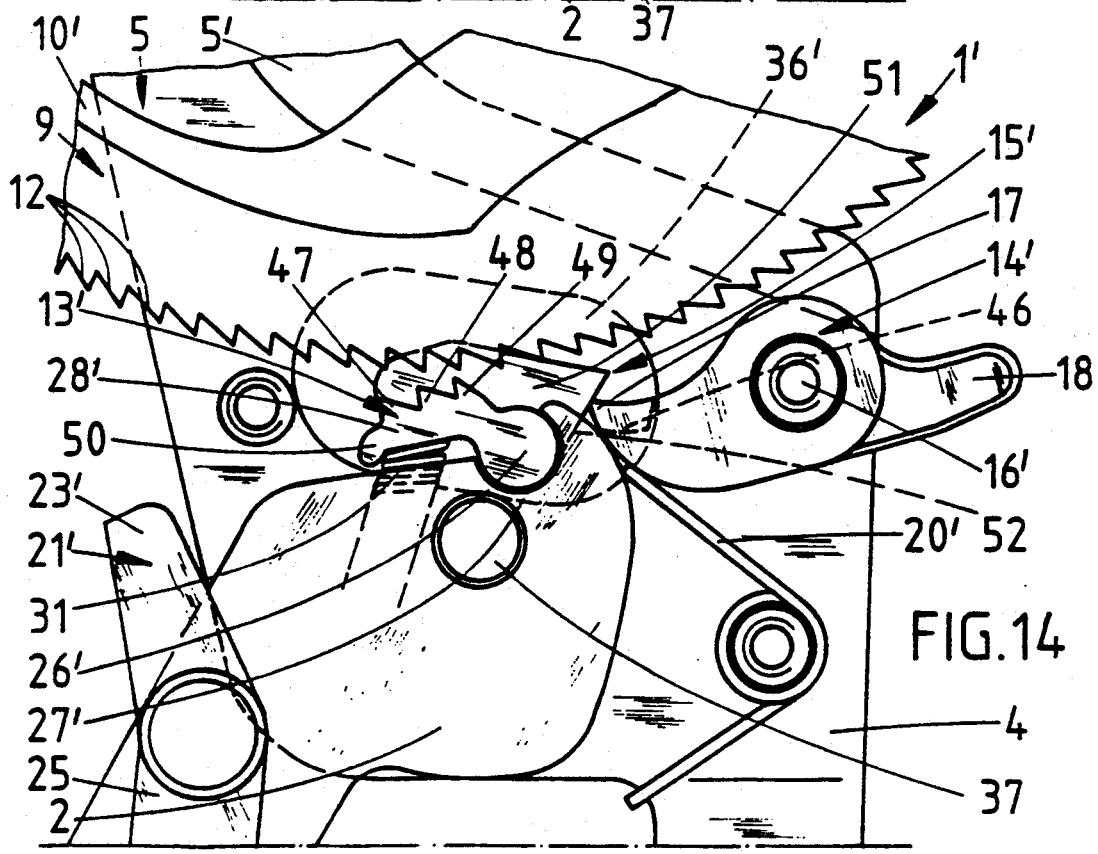

RATCHET CUTTER

FIELD AND BACKGROUND OF THE INVENTION

The present invention relates to a manually actuated ratchet cutter, in particular a cable cutter, having a movable handle part and a fixed handle part, the fixed handle part forming a first stationary cutting edge which is of substantially circular segment shape, a movable cutting edge being articulated, furthermore, on an upper end region of the fixed cutting edge for scissor-like cooperation with the fixed cutting edge, said movable cutting edge moving in a plane parallel to the first cutting edge and cooperating with the latter, and having a ratchet mechanism which comprises a blocking lever and an advancing lever and engages into a toothing developed on the outer periphery of the movable cutting edge, the blocking lever being, furthermore, movable into a release position.

Such a ratchet cutter is known as manually-actuated shears, in particular for cables, sections, etc. from U.S. Pat. No. 4,223,439, one handle part continuing into a fixed cutting jaw and a swingable cutting edge being mounted on the free end of said jaw. The cutting edge has an outside toothing which cooperates with a locking drive which is actuated by a movable handle and comprises an advancing lever and a blocking lever. For the release of this form lock, the advancing lever and the blocking lever are in engagement with a common unlocking slide. By displacement of the unlocking slide, the lever can be disengaged from the toothing and, as a result thereof, the cutting jaws released. This embodiment has the disadvantage that the slide must be held in the unlocking position until the swingable cutting jaw and its toothing have come out of the region of the locking drive. A locking in the release position of the movable cutting jaw is not possible.

SUMMARY OF THE INVENTION

It is an object of the present invention is to develop a ratchet cutter of the type described which is simpler from the standpoint of manufacture and more favorable from the standpoint of handling.

As a result of this development, there is created a ratchet cutter of the type described which is of increased value in use and in which the locking of the release position of the movable cutting jaw is possible, the structural means being developed in simple and suitable manner. For example, the blocking lever engages behind the advance lever in its release position in such a manner that the advance lever is moved out of engagement and immediately blocks the blocking lever in its release position. A cumbersome holding fast of the release mechanism is not required. This assures operation of the ratchet cutter by one hand which is favorable with respect to handling. It proves particularly advantageous in this connection that the blocking lever has an actuation extension. The number of individual parts is thus optimally reduced to a minimum and a reduction in weight is obtained since an additional unlocking element is eliminated. It is particularly advantageous in this connection that the actuation extension extends in the plane of the blocking lever and protrudes laterally over a covering plate. In this way, an ergonomically favorable action of release of the swingable cutting edge results. The actuation extension in this embodiment is located in the region of the thumb of the hand which actuates the ratchet cutter and thus assures optimal operation by one hand. Another advantage of this embodiment resides in the fact that a flatter construction results from this, since no further parts (unlocking elements, etc.) which must be placed on are required.

Another advantage results in the case of ratchet cutters in which the mounting region of the swing handle is received between a bearing plate of the fixed handle and a cover plate, due to the fact that a pivot pin of the advance lever is received loosely in an articulation formation of the swing handle and between the bearing plate and the cover plate. In this way, there is obtained another advantage for obtaining a flatter structural shape of the ratchet cutter. By the aforementioned development, there is obtained an arrangement of the advance lever in the same plane as the swing handle. It proves particularly advantageous in this connection that the articulation formation is substantially semi-circular. In order to achieve a dependable form lock between advance lever and swing handle, the articulation formation is preferably greater than 180°. Another advantageous feature consists therein that the advance lever extends into a receiving pocket developed in the bearing plate. The locking of the free travel of the swingable cutting jaw is preferably obtained in the manner that the advance lever has a blocking extension which engages under the swing lever and can be caught by the blocking lever. The advance lever/locking extension unit is, in this case, developed as a rocker, the fulcrum being located at the axial center point of the pivot pin. In the release position of the swingable cutting edge, the blocking lever engages behind the blocking extension, the advance lever being held out of engagement with the toothing of the cutting jaw. The blocking extension immediately holds the blocking lever in its release position. In this position, advance lever and blocking lever block each other and, as a result, effect a locking of the release position. Release of the lock is only possible intentionally in the manner that the actuation extension of the blocking lever is moved away with from the blocking extension and releases the latter. The advance lever is then again in engagement with the toothing of the swingable cutting edge. It is furthermore provided, in order to save parts and reduce the weight, that the locking lever and a blocking lever are acted on by a common spring. It is preferably provided that the spring urges the locking lever into an open position in the release position and the engagement position of the blocking lever. This development assures dependable actuation of the ratchet cutter. A locking of the tool can only take place intentionally, when the locking lever is moved against spring force into the locking position. It is also correspondingly advantageous for the spring to release the locking lever upon travel of the movable cutting jaw out of engagement with the blocking lever. As soon as the movable cutting edge leaves the region of the blocking lever, the latter is displaced into a release position by means of the force of the spring which is resting on the locking lever. Upon this turning movement of the blocking lever, the spring is finally carried along by a stop edge on the blocking lever and the locking lever is thus released. In this connection, it proves advantageous that the blocking lever is moved automatically, due to its weight distribution, without spring action into the locking position. As soon as the movable cutting edge moves out of the engagement of the blocking lever, which takes place only after superimposition of the cutting edges of the fixed and movable cutting edges, further advance of the movable cutting edge is not possible and the blocking lever automatically swings into its locked position. Thus, after cutting a cable or the like, it is not necessary to actuate the locking lever manually. After use, the ratchet cutter can immediately be placed aside in a secured condition. It is, furthermore, also advantageous that the swing handle can be swung optionally through an angle which corresponds to an advance by one or two teeth of the toothing of the movable cutting edge. One can thus choose between a slower or faster closing of the cutting edges. In another embodiment, the ratchet cutter is developed in the manner that the ratchet mechanism is formed essentially in a (flat) position between an upper cover plate and a lower cover plate, the required bottom or top engagement being effected by means of the formation of a pocket in the upper and/or lower cover plate. A ratchet cutter developed in this manner thus has a relatively flat structural shape. As a result of this shape of the ratchet cutter, which is optimal from a handling standpoint, it is now also possible to work in difficultly accessible areas. It is particularly advantageous in this connection that the blocking lever forms a projection which extends into the receiving pocket for the grasping of the advance lever. This advance lever in its turn has on its bottom a plate which extends beyond the contour of the advance lever and corresponds in its thickness essentially to the depth of the receiving pocket. The locking of the free travel of the swingable cutting jar is, in this case, achieved in the manner that the projection of the blocking lever engages behind the plate of the advance lever in the region of the receiving pocket, in which connection also, in this case, the advance lever is held out of engagement with the toothing of the cutting jaw. In order to eliminate the locking, it is merely necessary in this connection to press the handles together. Finally, it proves particularly advantageous that the plate and, in corresponding manner, the receiving pocket are developed with such a size that they are always superimposed with the cutting edge upon all movements.

BRIEF DESCRIPTION OF THE DRAWINGS

Additional advantages and details of the invention are explained in greater detail below with reference to two embodiments shown in the drawings, in which:

FIG. 4 is a side view of the ratchet cutter in the direction of the arrow x in FIG. 1;

FIG. 5 is an additional side view in the direction of the arrow y in FIG. 1;

FIG. 9 is an enlarged view of the release position of a movable cutting edge in relaxed position of the swinging lever;

FIG. 10 is a view corresponding to FIG. 9 but in the tensioned position of the swing lever;

FIG. 13 is an enlarged view of a portion of the ratchet mechanism;

FIG. 14 is a view corresponding to FIG. 13, the blocking lever, however, being held out of engagement with the movable cutting edge.

DETAILED DESCRIPTION OF THE PREFERRED EMBODIMENTS

Figure 1:
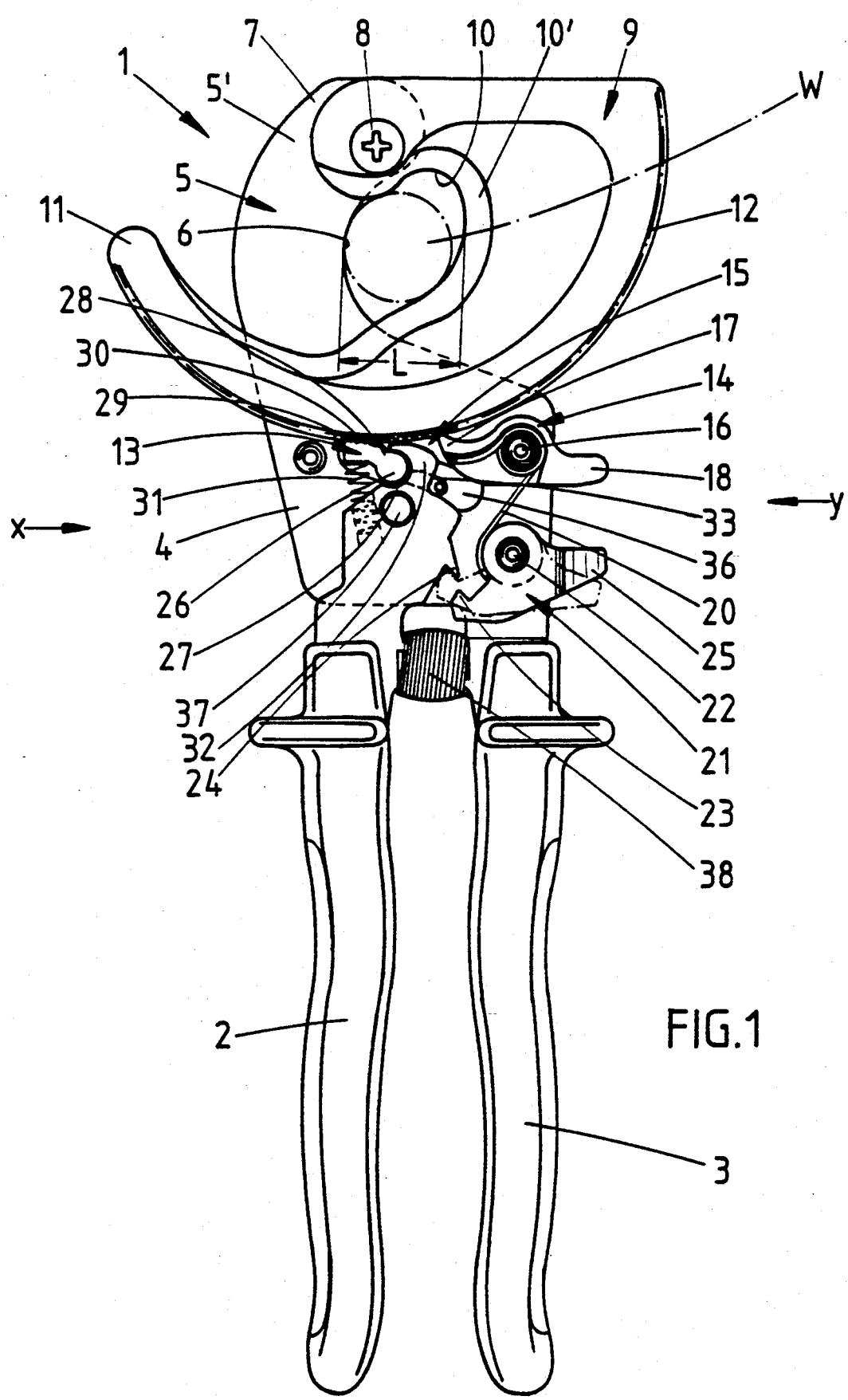
FIG. 1 is a front view of a ratchet cutter in accordance with the invention with the cover plate removed and in pressed-together upright position, in accordance with a first embodiment.
Figure 2:
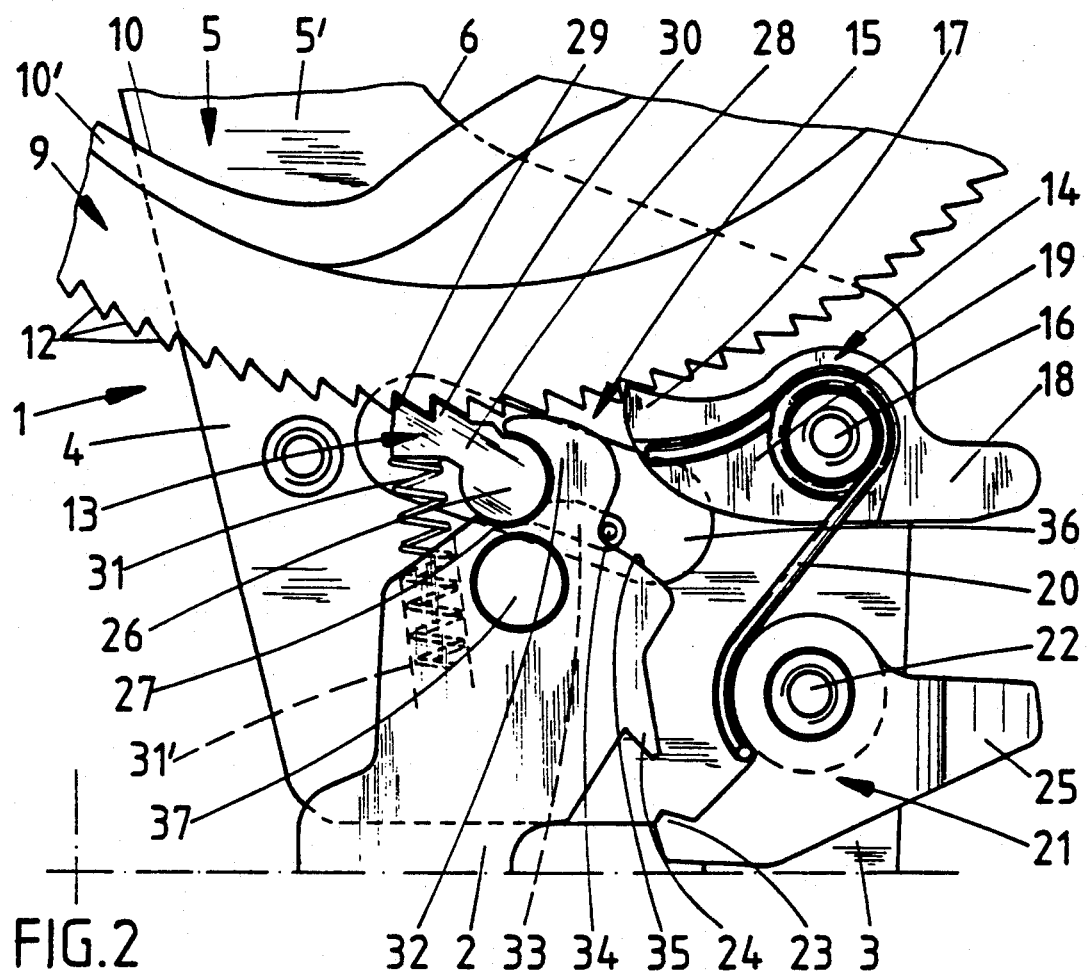
FIG. 2 is an enlargement of a detail of FIG. 1.
Figure 3:
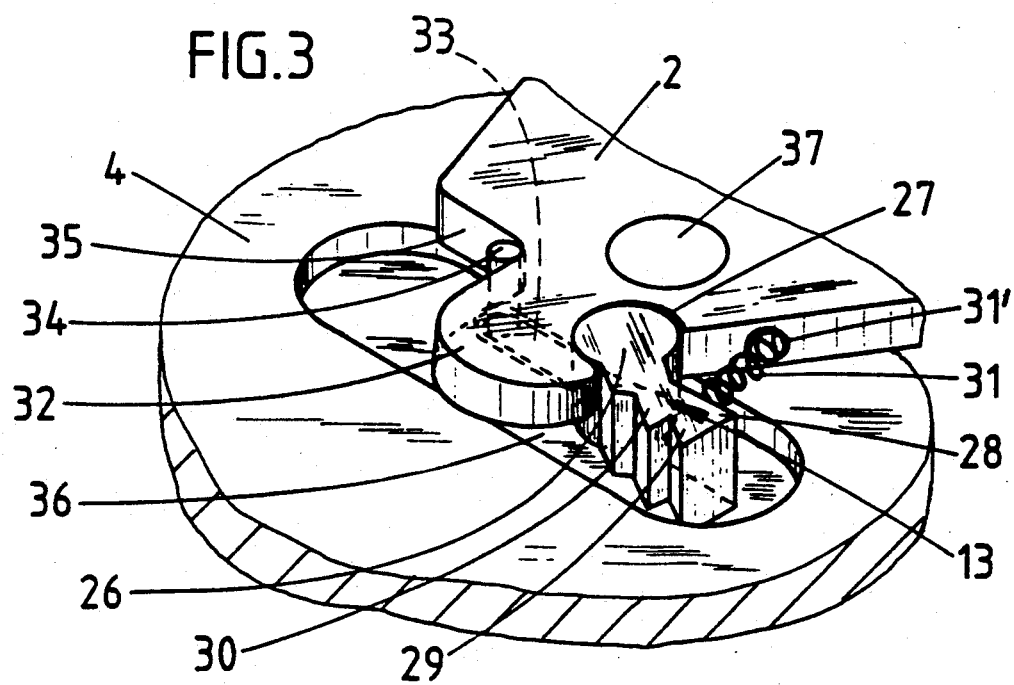
FIG. 3 shows, in perspective view, the region of an articulation formation in a swing handle receiving an advance lever.
Figure 6:
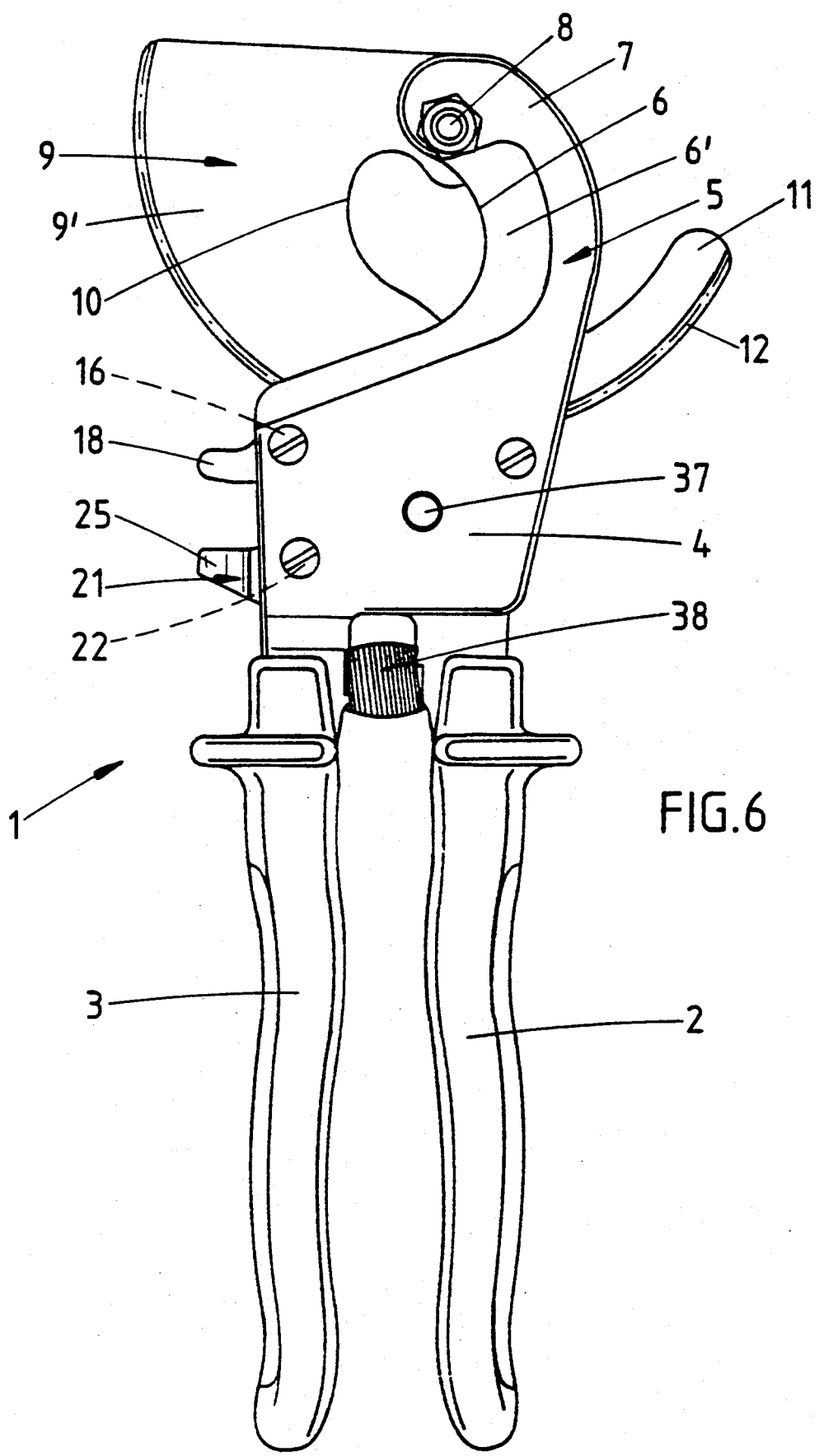
FIG. 6 is a rear view of the ratchet cutter.
Figure 7:
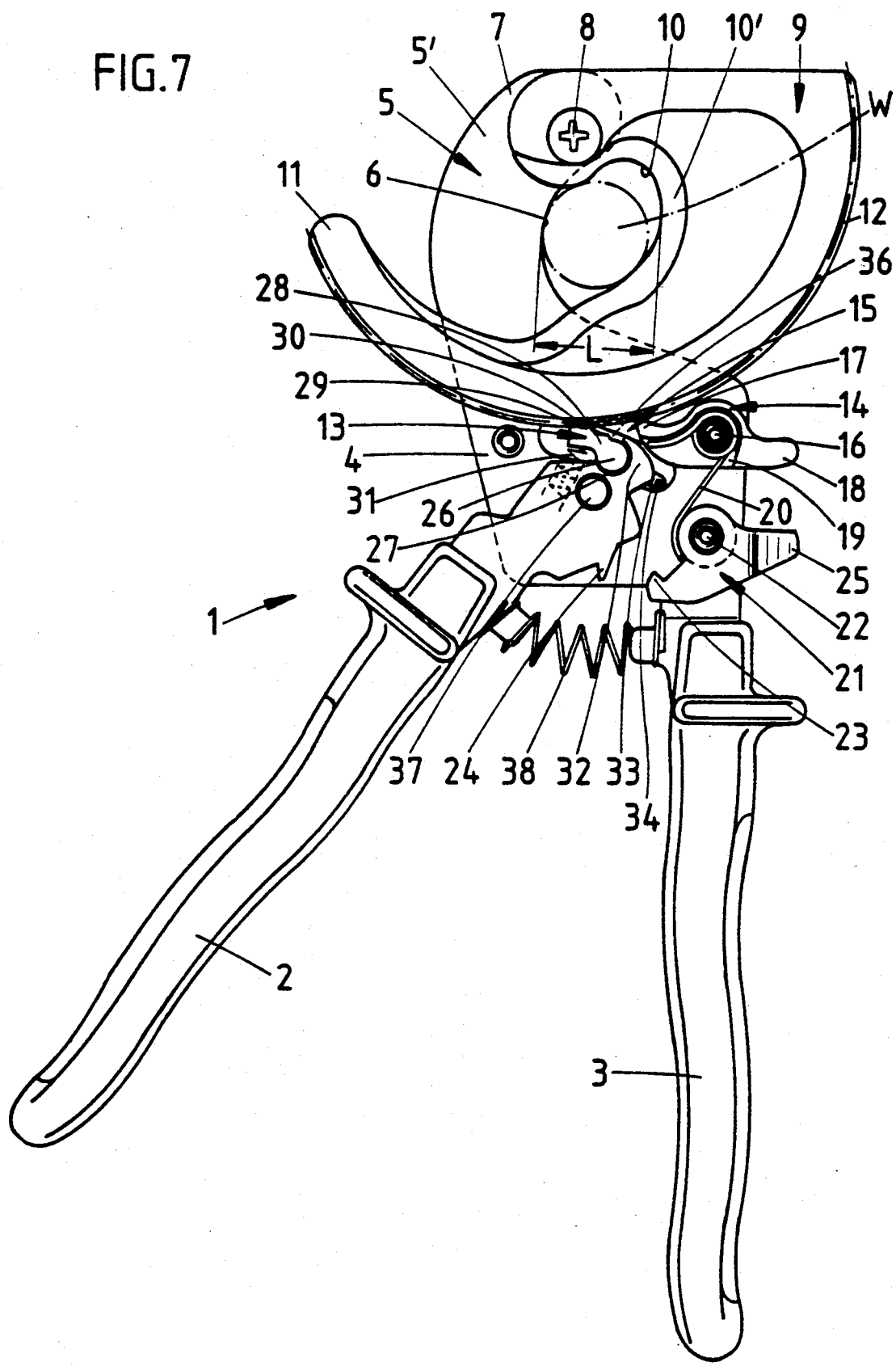
FIG. 7 is a showing corresponding to FIG. 1, but in relaxed operating position.
Figure 8:
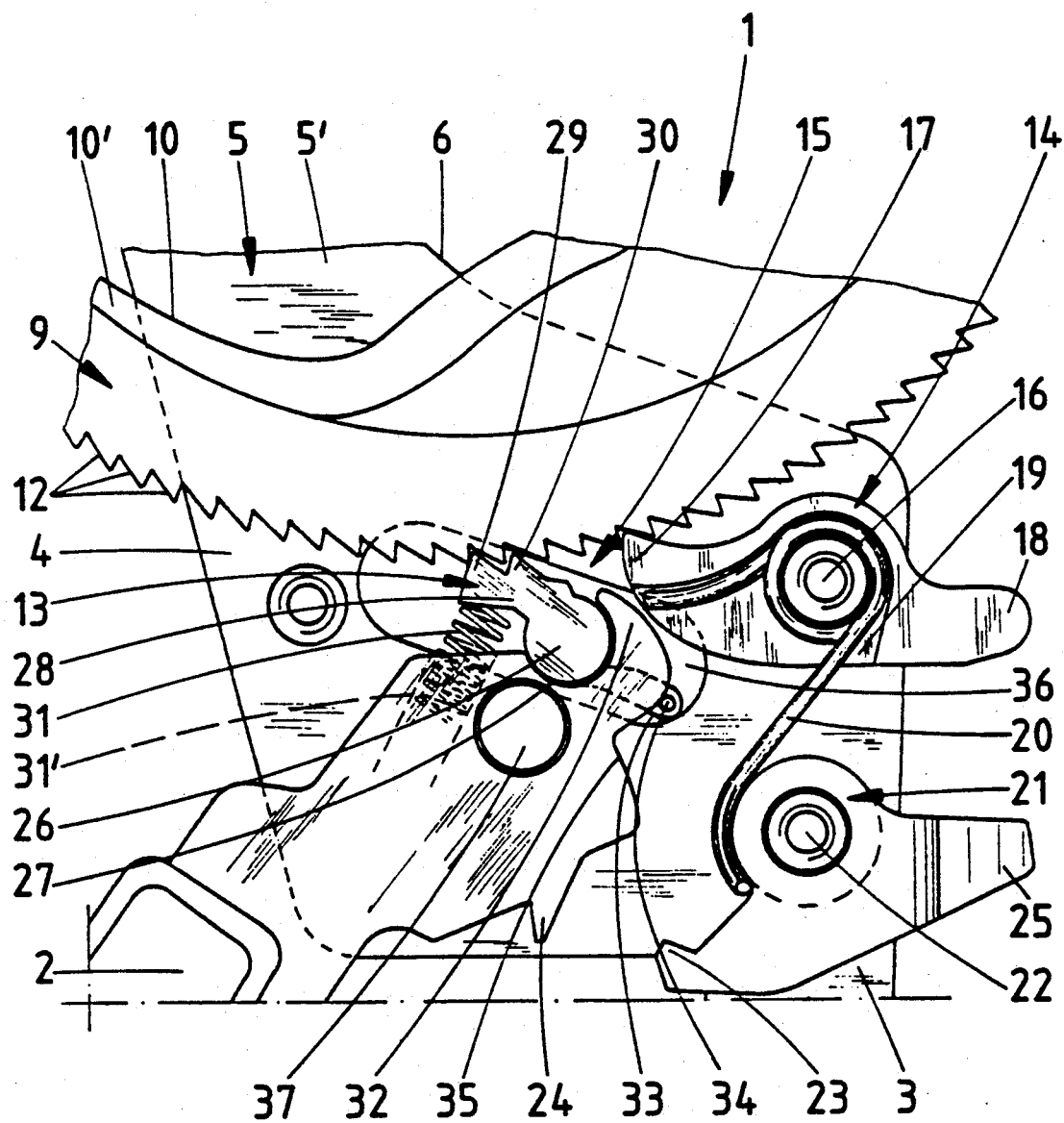
FIG. 8 is an enlargement of a detail of FIG. 7.
Figure 11:
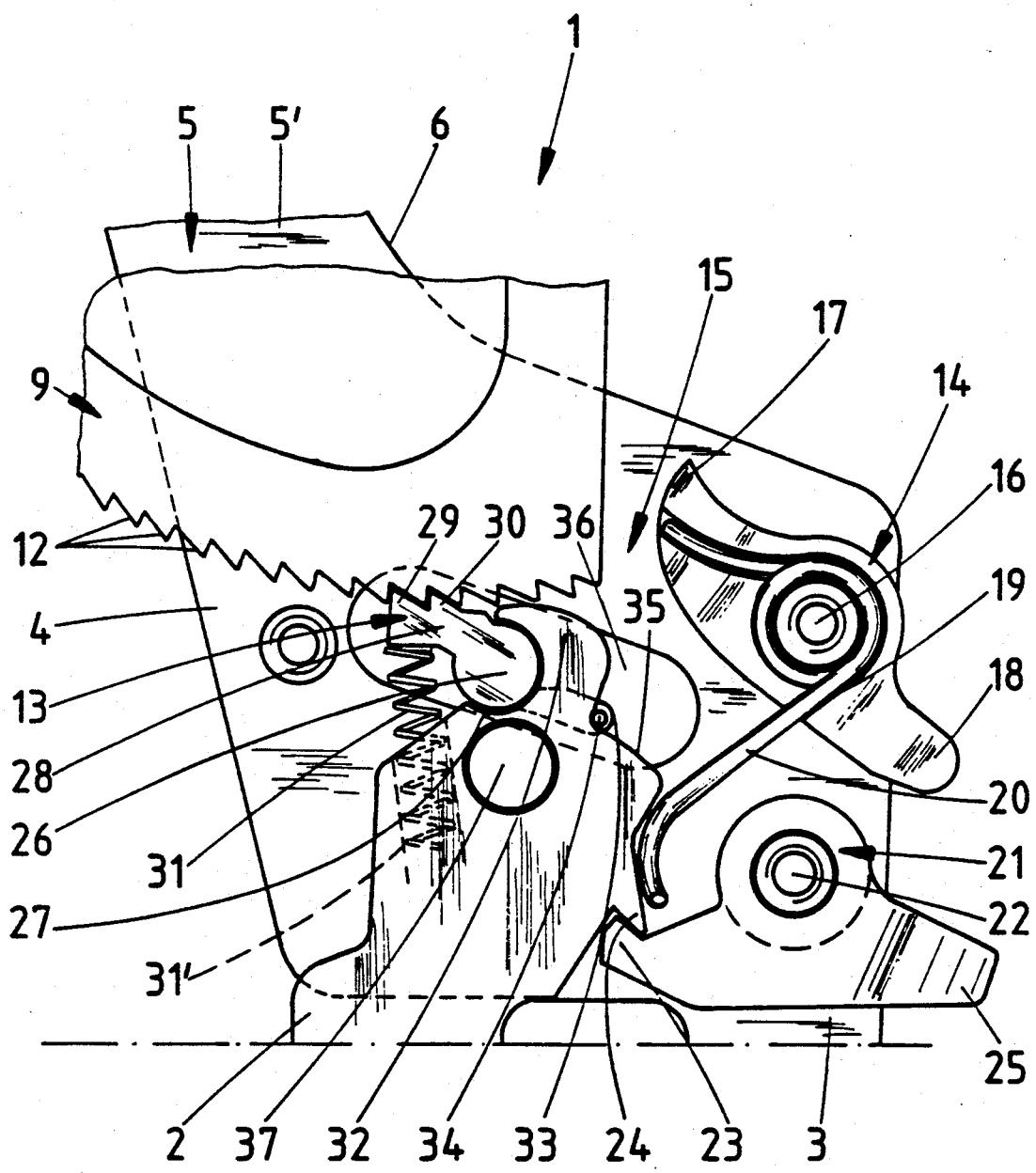
FIG. 11 is an enlarged view of the locking position, the movable cutting edge having moved out of the region of the blocking lever and the locking lever having been displaced automatically into the locking position.
Figure 12:
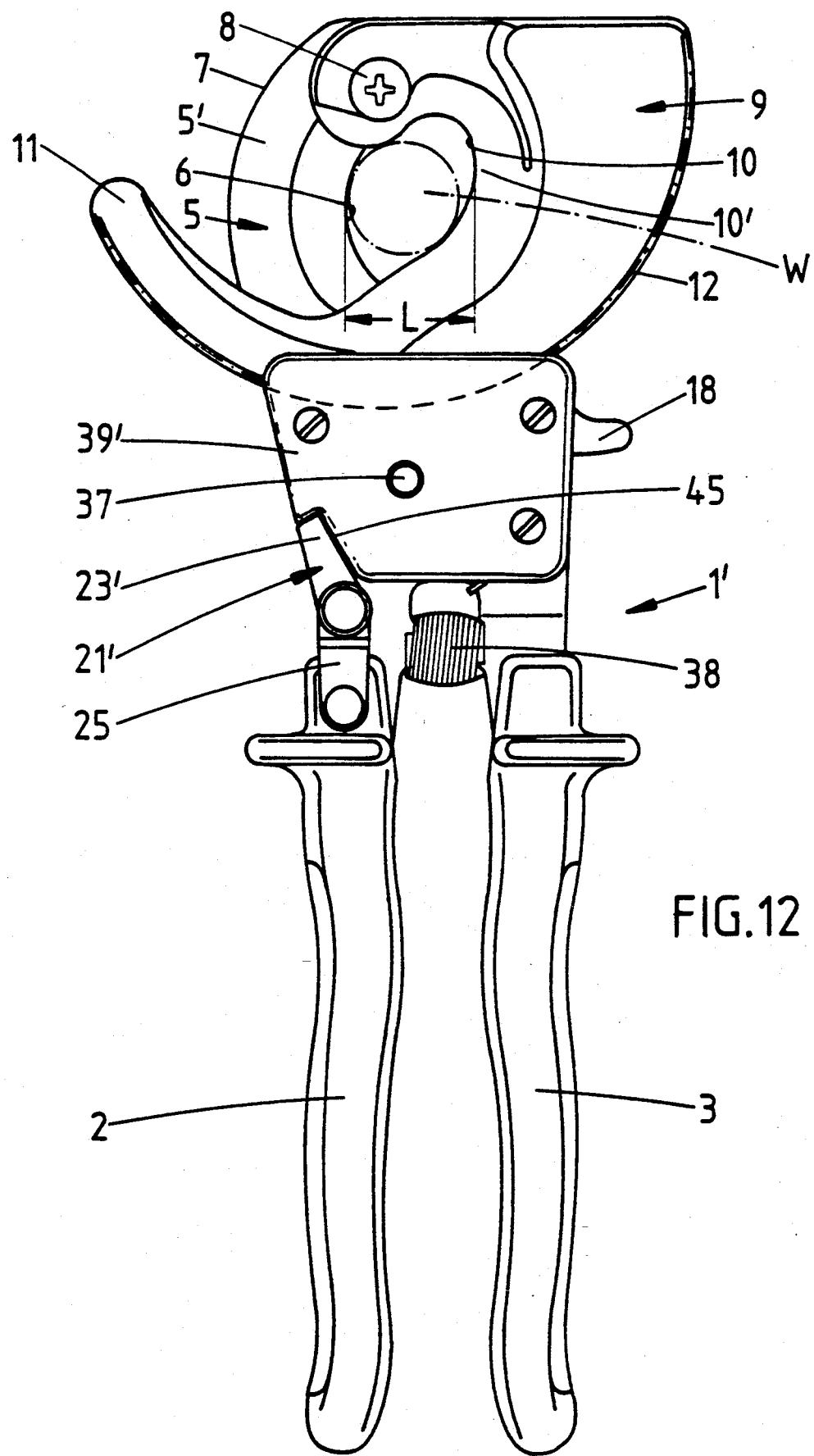
FIG. 12 is a front view of the ratchet cutter in pressed-together and secured operating position, relating to a second embodiment.
Figure 15:
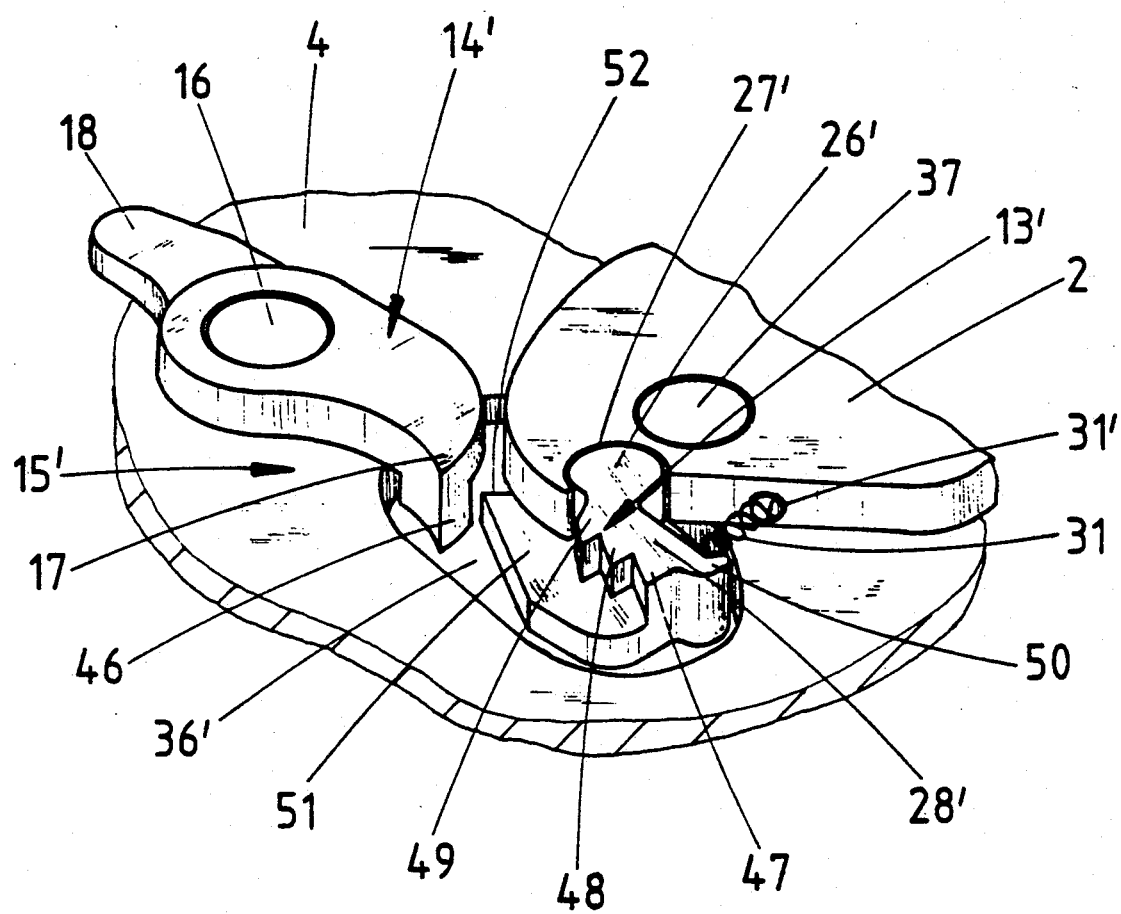
FIG. 15 is a view in perspective of the region of the ratchet mechanism.

The ratchet cutter 1 of the first embodiment shown in FIGS. 1 to 11, has a swing handle 2 and a fixed handle 3 which passes integrally into a substantially rectangular bearing plate 4. Extending from this bearing plate 4, there is formed a fixed cutting jaw 5 having an arcuate, continuously concavely extending cutting edge 6. The cutting jaw 5 forms at its upper end region 7 a swivel bearing 8 for mounting the movable cutting jaw 9, having the shape of a circular segment, with the cutting edge 10. The movable cutting jaw 9 moves in a plane parallel to the fixed cutting jaw 5, the flat surfaces 9' and 5' sliding on each other upon the cutting. On the sides of the cutting jaws 9 and 5 facing away from the flat surfaces 9' and 5', the cutting edges 10 and 6 have cutting bevels 10' and 6' respectively. The cutting edge 10 of the movable cutting jaw 9 extends, proceeding from the swivel bearing 8, curved, strongly concave and passes into a slightly convex region and, finally, into another less strongly concave region up into the end region 11. On the outer circumference of the movable cutting jaw 9, the latter is provided with a toothing 12 or developed as toothed segment.

A ratchet mechanism 15 having an advance lever 13 and a blocking lever 14 engages into the toothing 12. The blocking lever 14 is seated freely swingable on a journal pin 16 arranged on the bearing plate 4 and forms at its one end a detent projection 17 and on its opposite end a handle 18 which protrudes laterally beyond the bearing plate 4. In a recess 19 which includes the region of the journal pin 16, the blocking lever 14 has a spiral spring 20 associated with it, the one end of the spiral spring resting in the region of the detent projection 17 against the wall of the recess 19. The other end of the spiral spring 20 acts on a locking lever 21 which, mounted on the pin 22 associated with the bearing plate 4, is held in counterclockwise direction in an open position. On its end facing the swing handle 2 the locking lever 21 forms a locking extension 23 which engages, in locking position, behind an extension 24 of the swing handle 2 and thus catches the swing handle 2. At its end opposite the locking extension 23, the locking lever 21 has a locking handle 25 which protrudes laterally beyond the bearing plate 4.

The advance lever 13 is mounted with a pivot pin 26 in a circular segment-shaped articulation formation 27 of the swing handle 2, the articulation formation 27 being greater than 180°. A lever 28 with two cut out detent teeth 29 and 30 is formed on the pivot pin 26, the detent teeth engaging under the action of a spring 31 which finds its abutment in a bore 31' in a front side of the swing handle, into the toothing 12 of the cutting jaw 9. On the side of the pivot pin 26 opposite the lever 28, the pivot pin has developed on it a blocking extension 33 of smaller cross section which engages below the projection 32 forming the articulation formation 27. The blocking extension 33 rests, upon form lock of the detent teeth 29 and 30 with the toothing 12, via a stop pin 34 against a side surface 35 of the swing handle 2. The advance lever 13 extends from the top side of the swing handle 2 up into a recess 36 in the bearing plate 4. The distance between the bottom side of the swing handle 2 and the bottom of the recess 36 corresponds, in this connection, to the thickness of the blocking extension 33 engaging below the projection 32.

The swing handle 2 is mounted on a swivel pin 37. A spiral spring 38 arranged between the swing handle 2 and the fixed handle 3 constantly urges the handles into open position in which the two handles are spread apart.

The advance lever 13, the blocking lever 14, the locking lever 21, the cutting jaw 9 and the head region of the swing handle 2 are all arranged in the same plane, are all of the same thickness, and are covered by a cover plate 39 which is screwed on. This results in a very flat sandwich construction which is formed of 3 planes. The first plane is formed by the bearing plate 4 with the cutting jaw 5 extending therefrom. The second plane consists of the above-mentioned individual parts of the same thickness which are placed on the first plane. The third plane, finally, is formed by the cover plate 39.

Proceeding from the operating position shown in FIG. 1, the operation is as follows:

The movable cutting jaw 9 partly surrounds a workpiece W located between the cutting edge 10 of the cutting jaw 9 and the cutting edge 6 of the cutting jaw 5, the cutting jaw 9 being in engagement, via its toothing 12, with the ratchet mechanism 15. The cutting jaw 9 is guided, in this case, in a slot 40 provided between the bearing plate 4 and the cover plate 39. By the continuous alternating releasing and pressing together of the handles 2 and 3, the movable cutting jaw 9 is now advanced stepwise by means of the feed drive formed of its toothing 12 and the ratchet mechanism 15. Upon release of the swing handle 2, it swings under the action of the spiral spring 38 and moves, upon this displacement, via the articulation formation 27, the advance lever 13 against the direction of advance of the cutting jaw 9, the ratchet teeth 29 and 30 moving away over the toothing 12 in the manner of a ratchet under the action of the spring 31. In this connection, the blocking extension 33 leaves its stop position on the side surface 35 of the swing handle 2 and now rests against the wall of the recess 36 in the bearing plate 4. Upon the pressing of the handles 2 and 3 together, the advance lever 13 moves the cutting jaw 9 in closing direction, whereby the inside distance L between the two cutting jaws 6 and 10 is reduced. During this process the blocking lever 14 ratchets over the toothing 12 and blocks the cutting jaw 9 against swinging back as could happen, for instance, in the case of an elastic workpiece W or upon the release of the swing handle 2. By releasing the swing handle 2 to a greater or a lesser extent, a different advance can be obtained, corresponding to either one or two teeth. The workpiece W is cut by the cutting edges 6 and 10 as soon as the inside distance L has become 0 or less. As soon as the movable cutting edge 9 moves out of engagement with the blocking lever 14, the latter is displaced under the action of the initial spring tension into the range of swing of the cutting jaw 9, it carrying the spiral spring 20 along upon this displacement and thus releases the locking lever 21. Due to its weight distribution, the latter now swings automatically into the locking position in which the locking projection 23 catches the projection 24 of the swing handle 2 and blocks it. A releasing of the lock is only possible intentionally, in the manner that the locking lever 21 is swung back by means of the locking handle 25. A locking of the ratchet cutter 1 is, however, also possible if the movable cutting jaw 9 is still in engagement with the blocking lever 14. In this connection, it is merely necessary for the locking lever 21 to be swung manually against the force of the spiral spring 20.

Release of the engagement between the toothing 12 and the ratchet mechanism 15 can take place in the pushed together condition of the handles 2 and 3. By means of a handle 18, the blocking lever 14 is swung out of engagement with the toothing 12 against the force of the spiral spring 20. The swing handle is then released, the stop pin 34 of the blocking extension 33 being applied against the side wall of the blocking lever 14 in the region of the detent projection 17. This application has the result that the advance lever 13 swings around the axial center point of the pivot pin 26 and, thus, also comes out of engagement with the toothing 12. The cutting jaw 9 can now be freely rotated in both directions. As the situation shown in FIG. 9 illustrates, the mutual blocking of the advance lever 13 and the blocking lever 14 results in a locking of the release position. This is due to the fact that the blocking lever 14 endeavors to move back in clockwise direction under spring force. This moment of rotation, however, is opposed by the endeavor of the advance lever 13 also to swing under spring force into the engagement position. These two oppositely directed moments of rotation cancel each other out at the point of contact between stop pin 34 and the side wall of the blocking lever 14. Mutual blocking of the two levers 13 and 14 thus results. As can be noted from FIG. 10, this locking is also retained upon the pressing of the handles 2 and 3 together. A loosening of the release position is effected in very simple manner. By means of the handle 18, the blocking lever 14 is swung against the force of the spiral spring 20 until the blocking lever 14 releases the stop pin 34 and, thus, makes it possible for the advance lever 13 to swing back into the engagement position with the toothing 12. After this, the blocking lever 14 can also move back into the engagement position.

The construction of the ratchet cutter 1' of the second embodiment, shown in to FIGS. 12 to 15, corresponds essentially to that of the ratchet cutter 1 of the first embodiment, the same reference numbers for identical parts being also used in this embodiment.

The locking of the ratchet cutter 1' takes place by means of a locking lever 21' developed as rocker which is mounted for swinging by means of a rivet or the like on the swing handle 2. The locking lever 21' has at its one end a locking handle 25 which extends into the handle region of the swing handle 2 and, at its other end, a locking extension 23'. The latter swings in locking position into an edge-side recess 45 in the cover plate 39'. The handle 2 which is urged into outward swung position by the spiral spring 38 rests in locking position via the end surface of the locking extension 23' against a correspondingly shaped stop shoulder of the recess 45. For the unlocking of the ratchet cutter 1' the locking lever 21' is brought into open position by thumb actuation, in which connection the locking extension 23' moves out of the recess 45 of the cover plate 39' and thus releases the swing lever 2.

As can noted from FIG. 13, the ratchet mechanism 15' also consists of an advance lever 13' and a blocking lever 14'. The recess 36' in the bearing plate 4 is in this case made larger than in the first embodiment. In the region of the detent projection 17, the blocking lever 14' has a projection 46 developed on it which extends into the recess 36'.

In accordance with FIG. 13, the advance lever 13' is mounted by a pivot pin 26' in a circular-segment-shaped articulation formation 27' of the swing handle 2, a lever 28' having 3 detent teeth 47 to 49 formed thereon being developed on the pivot pin 26', the detent teeth engaging into the toothing 12 of the cutting jaw 9 under the action of a spring 31 which finds its abutment in a bore 31' in one end of the swing handle. At its end the lever 28' has a bead 50. This bead 50 prevents the spring 31 form losing its support on the lever 28' upon swinging movements of the advance lever 13'. A plate 51 is formed on the bottom of the advance lever 13', the plate extending beyond the contour of the advance lever 13'. Its thickness corresponds essentially to the depth of the recess 36'.

The manner of operation of the ratchet cutter 1' corresponds to that of the first embodiment.

In this embodiment, the releasing of the engagement between the toothing 12 and the ratchet mechanism 15' takes place as follows:

When the handles 2 and 3 are pressed together, the blocking lever 14' is swung by its handle 18 out of engagement with the toothing 12 against the force of a spiral spring 20' which rests at one end against the blocking lever 14' and at the other end against the bearing plate 4. The swing handle 2 is now released, the plate 51 of the advance lever 13' resting via its stop edge 52 on the projection 46 arranged in the region of the detent projection 17 of the blocking lever 14'. This support has the result that the advance lever 13' swings around the axial center point of the pivot pin 26' and thus also comes out of engagement with the toothing. The cutting jaw 9 can now be freely rotated in both directions. It can be noted from FIG. 14 that the mutual blocking of the advance lever 13' and the blocking lever 14' results in a locking of the release position, which takes place in the region of the recess 36'. A loosening of the release position is effected by a simple pressing together of the two handles 2 and 3. The blocking lever 14' which is urged upward (in the drawing) under spring pressure moves automatically out of the detent engagement behind the plate 51 when the handles 2, 3 are pressed together.

As can be noted from FIGS. 13 and 14, the plate 51 is always at least partially covered by the cutting jaw 9 upon all movements of the ratchet mechanism 15'. As a result of this measure, a high degree of stability is obtained in the region of the advance lever 13'.

We claim:

1. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position.

2. A ratchet cutter according to claim 1, wherein the blocking lever has a handle extension.

3. A ratchet cutter according to claim 2, further comprising
a cover plate,
the handle extension extends in a plane of the blocking lever and extends laterally beyond said cover plate.

4. A ratchet cutter according to claim 1, wherein
the moveable handle part is pivoted to the fixed handle part, and a pivoting of the moveable handle part about the fixed handle part caries the toothed portion of the advance lever along the toothing of the moveable cutting edge; and
the moveable handle part is swingable through an angle to advance the toothed portion of the advance lever by at least one tooth of the toothing of the moveable cutting edge.

5. A ratchet cutter according to claim 1, wherein
the moveable handle part pivots about the fixed handle part;
the cutter further comprises a spring urging apart the moveable and the fixed handle parts; and
the blocking lever is moveable into engagement with the blocking extension only in a closed position of the moveable and the fixed handle parts and, upon subsequent opening, the position of release is retained by the action of the spring in urging apart the moveable and the fixed handle parts.

6. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position;

a bearing region of the moveable handle part is received between a bearing plate of the fixed handle part and a cover plate, and wherein a pivot pin of the advance lever is loosely received in an articulation formation of the moveable handle part and between the bearing plate and the cover plate.

7. A ratchet cutter according to claim 6, wherein the articulation formation is substantially semi-circular in shape.

8. A ratchet cutter according to claim 6, wherein the articulation formation is greater than 180°.

9. A ratchet cutter according to claim 6, wherein the advance lever extends into a receiving pocket developed in the bearing plate.

10. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position; and the blocking extension of the advance lever is engageable with the blocking lever.

11. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position;

wherein the cutter further comprises a locking lever pivotally mounted to the fixed handle part, and a spring acting on both the blocking lever and the locking lever to urge the blocking lever and the locking lever away from the movable handle part; and a pivotal mounting of the locking lever permits extension of the locking lever from the fixed handle part toward the movable handle part for holding the moveable handle part adjacent the fixed handle part.

12. A ratchet cutter according to claim 11, wherein in the positions of release and engagement of the blocking lever with said toothing of the moveable cutting edge, the spring urges the locking lever into an open position which allows the moveable handle part to swing away from the fixed handle part.

13. A ratchet cutter according to claim 12, wherein the spring releases the locking lever when the toothing of the moveable cutting edge moves out of engagement with the blocking lever.

14. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position; and the cutter further comprises a cover plate and a bearing plate spaced apart from each other and secured to the fixed handle part, the ratchet mechanism is substantially formed in a planar configuration between the cover plate and the bearing plate, the ratchet mechanism being secured to the cover plate and the bearing plate.

15. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position;

the blocking lever forms a projection which extends towards the advance lever in order to catch the advance lever.

16. A ratchet cutter, according to claim 15, further comprising a bearing plate extending from the fixed handle part, and wherein there is a recess in the bearing plate and the projection of the blocking lever extends into the recess;

the blocking extension of the advance lever is formed as a plate which extends beyond the contour of the advance lever and which corresponds in its thickness substantially to the depth of the recess for engagement with the projection of the blocking lever.

17. A ratching cutter, according to claim 16, wherein the plate of the advance lever and the recess of the bearing plane are disposed alongside the moveable cutting edge.

18. A manually-operated ratchet cutter, in particular a cable cutter, having a moveable handle part and a fixed handle part, the fixed handle part forming a first fixed cutting edge which is developed substantially in the shape of a circular segment, and, furthermore, a moveable cutting edge being articulated on an upper end region of the fixed cutting edge for scissor-like cooperation with the fixed cutting edge, which moveable cutting edge moves in a plane parallel to the first cutting edge and cooperates with it, and having a ratchet mechanism which comprises a blocking lever and an advance lever and engages in a toothing developed on the outer circumference of the moveable cutting edge, the advance lever being mounted to the moveable handle part by a pivot pin secured to the moveable handle part, and the blocking lever being moveable into a release position, wherein the advance lever comprises a toothed portion extending in a forward direction from the pivot pin and a blocking extension extending in a backward direction from the pivot pin opposite said toothed portion;

the blocking lever engages the blocking extension of the advance lever in order to set the release position, wherein the toothed portion of the advance lever is pivoted out of engagement with the toothing of the moveable cutting edge, and at the same time, the blocking extension of the advance lever blocks the blocking lever in the release position;

the moveable handle part pivots about the fixed handle part, a pressing together of the moveable and the fixed handle parts producing a distance of the advance lever from the blocking lever; and engagement of the blocking lever with the advance lever is releasable when the moveable and the fixed handle parts are pressed together.

19. A manually-operated ratchet cutter suitable for cutting a cable, comprising:

a moveable handle part and a fixed handle part, the fixed handle part forming a fixed cutting edge, the moveable handle part being movable relative to the fixed handle part;

a spring extending between the handle parts to urge the handle parts into an open position of the cutter;

a moveable cutting edge articulated on an upper end region of the fixed cutting edge for scissor-like cooperation with the fixed cutting edge, which moveable cutting edge moves in a plane parallel to the fixed cutting edge and cooperates with it; and a ratchet mechanism which comprises a blocking lever, an advance lever and a toothing developed on the outer circumference of the moveable cutting edge, the blocking and the advance levers being engageable with the toothing, the blocking lever being moveable into a release position for disengagement of the blocking lever and the advance lever from the toothing upon a squeezing together of the handle parts, wherein upon entering the release position, the blocking lever engages the advance lever in order to hold the release position; and the blocking lever is moveable into engagement with a blocking extension of the advance lever only in a closed position of the handle parts and, upon subsequent opening, the position of release is retained by action of the spring in urging the handle parts apart.

20. A manually-operated ratchet cutter suitable for cutting a cable, comprising:

a moveable handle and a fixed handle, said fixed handle extending into a first fixed cutting edge,;

a moveable arm having a cutting edge and being articulated upon an upper end region of said fixed cutting edge for scissor-like cooperation with the fixed cutting edge;

a ratchet mechanism which comprises a blocking lever, an advance lever and a set of teeth disposed along said arm and being engageable with said blocking lever and said advance lever, wherein said blocking lever is pivotally mounted to an extension of said fixed handle;

a pivot assembly connecting said advance lever to said moveable handle;

a release handle extending from said blocking lever to place said blocking lever in a blocking position or a release position for disengagement from said teeth; and means operatively coupled to said advance lever for urging both said advance lever and said blocking lever into positions of disengagement from said teeth upon a squeezing together of said movable handle and said fixed handle and upon an operating of said release handle to place said blocking lever in said release position.

* * * * *